(12) United States Patent
Kedia et al.

(10) Patent No.: US 11,018,902 B1
(45) Date of Patent: May 25, 2021

(54) HIGH FREQUENCY MORSE CODE TRANSMISSION

(71) Applicant: International Business Machines Corporation, Armonk, NY (US)

(72) Inventors: Pravin Kailashnath Kedia, Mumbai (IN); Sudhir Bhaurao Titirmare, Pune (IN); Sajesh Sreedharan Kakkara, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/733,061

(22) Filed: Jan. 2, 2020

(51) Int. Cl.
*H04W 4/00* (2018.01)
*H04L 15/04* (2006.01)

(52) U.S. Cl.
CPC ................ *H04L 15/04* (2013.01)

(58) Field of Classification Search
CPC .................................................. H04L 15/04
USPC ............................................... 455/426.1
See application file for complete search history.

(56) References Cited

U.S. PATENT DOCUMENTS

| | | | | |
|---|---|---|---|---|
| 2001/0004588 A1* | 6/2001 | Hong | .................... | G08B 25/10 |
| | | | | 455/404.1 |
| 2009/0207693 A1* | 8/2009 | Schuster | ................ | G01V 1/001 |
| | | | | 367/38 |
| 2013/0151147 A1* | 6/2013 | Houberdon | ............. | G01S 1/024 |
| | | | | 701/514 |
| 2013/0218959 A1 | 8/2013 | Sa | | |
| 2013/0268929 A1* | 10/2013 | Tyhurst | ................. | G06F 9/4411 |
| | | | | 718/1 |
| 2014/0280005 A1* | 9/2014 | Powers | ................. | G06F 16/951 |
| | | | | 707/706 |
| 2015/0195313 A1 | 7/2015 | Lewis | | |
| 2017/0013576 A1 | 1/2017 | Jung | | |
| 2019/0230488 A1 | 7/2019 | Oga | | |

FOREIGN PATENT DOCUMENTS

CN     109818695 A     5/2019

OTHER PUBLICATIONS

Sonnet: World's Most Advanced Off-Grid Mobile Mesh Network; retrieved from website on Dec. 30, 2019; https://www.kickstarter.com/projects/sonnet/sonnet-decentralized-mobile-communication.
System and Method for Wireless Communication via a Middleman When Out of Coverage Area; An IP.com Prior Art Database Technical Disclosure; Jan. 10, 2007.

* cited by examiner

*Primary Examiner* — Marcos Batista
(74) *Attorney, Agent, or Firm* — Fabian VanCott; Steven L. Nichols

(57) ABSTRACT

The present specification describes a system. The system includes a code generator to 1) generate a Morse code message from an intended message and 2) decode a received Morse code message. The system also includes a high-frequency transceiver to 1) transmit Morse code messages in the high frequency electromagnetic range and 2) receive Morse code messages in the high frequency electromagnetic range.

17 Claims, 9 Drawing Sheets

HIGH FREQUENCY MORSE CODE TRANSMISSION

BACKGROUND

The present invention relates to transmission of messages between electronic devices, and more specifically to the conversion of messages into Morse code and transmitting those messages in the high frequency range when a user is outside of a mobile network range.

SUMMARY

According to an embodiment of the present invention, a system is described. The system includes a code generator that generates a Morse code message from an intended message. The code generator also decodes a received Morse code message. The system also includes a high-frequency transceiver that 1) transmits Morse code messages in the high frequency electromagnetic range and 2) receives Morse code messages in the high frequency electromagnetic range.

The present specification also describes a computer-implemented method. According to the method, a trigger is received from a mobile device. The trigger is to generate a high frequency Morse code message. An intended message is converted into a Morse code message. The Morse code message is transmitted in a high frequency electromagnetic frequency range.

The present specification also describes a computer program product. The computer program product includes a computer readable storage medium having program instructions embodied therewith. The program instructions are executable by a processor, to cause the processor to generate an intended message and convert the intended message into a Morse code message. The instructions are also executable by the processor to cause the processor to convert metadata associated with the intended message into Morse code. In this example, the metadata includes identification information for an intended recipient. The Morse code message and metadata-based Morse code are transmitted in a high frequency electromagnetic frequency range.

DETAILED DESCRIPTION

Figure 1:
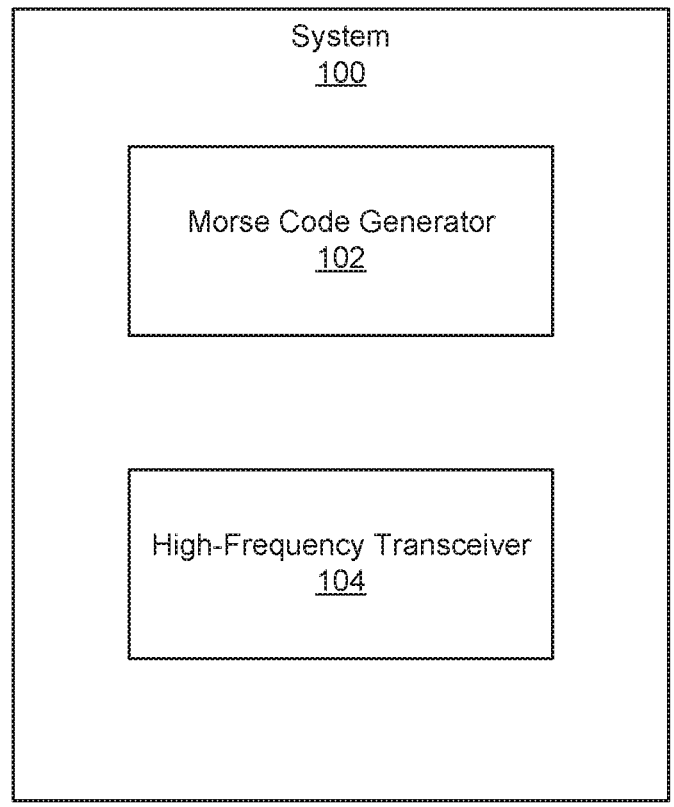
FIG. 1 depicts a system for high frequency Morse code transmission, according to an example of principles described herein.

The present invention may be a system, a method, and/or a computer program product any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may in fact be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Communication devices have come a long way over the past decades to become a common tool for a large percentage of the world's population. Such devices allow people to communicate with one another under innumerable circumstances. For example, people can talk via phone or communicate via text across a good portion of the globe. However, even with such widespread applicability, some characteristics reduce their utility in some circumstances. For example, current technologies may not detect a user's contacts based on current location of the user. Moreover, often times a user is outside of a mobile network range. For example, mobile devices generally communicate in the ultra-high frequency range, which may have a limited data transmission range. For example, an individual may be in a remote location that is removed from a mobile network communication tower. Accordingly, the individual may not be able to communicate with another individual using a mobile network. Were something to happen to that individual, for example if a medical accident were to have occurred, that individual, being outside of a mobile network range, may not have a way to communicate and get the help they may need.

Accordingly, the present specification describes a hardware device that can communicate messages via mobile devices even when outside the range of ultra-high frequency mobile communication networks. In some cases, mobile devices have contact libraries, such as social media contacts. The present specification may, using these libraries, identify contacts who are close to a particular user and may transmit messages, such as an SOS message, to the contacts of the individual who sent the message.

Specifically, the present specification describes an electronic device, which may be a mobile phone or some separate electronic device tethered to a mobile phone, to transmit messages using Morse code even when there is not internet or mobile network access. Such transmission is via the high frequency range. High frequency transmission is suitable for long-distance communication as transmitted signals are reflected off the ionosphere back to other locations around the globe. As described above the present specification describes an integrated circuit or other hardware device disposed in an electronic device.

In some examples, the input to be transmitted as a Morse code may be of a variety of types including a user predefined message, a scheduled message, keypad commands or text message, etc. To send these messages, hardware components of the electronic device negotiate and pair electronic devices using Morse code using such information as unique device identifiers, location information, etc. In some examples, the Morse code translation is behind the scenes and a user may not have to be familiar with Morse code to send such messages.

Such a system, method, and computer program product 1) allow for long range message transmission even when outside of a mobile communication network; 2) can be used on a compact device that consumes little power; 3) can work on a variety of mobile devices including older mobile devices; 4) can be implemented on a hardware chip on communicating devices; 5) transmit messages over long distances without a mobile tower or the internet; 6) provides globally interpretable encoding and decoding of signals.

As used in the present specification and in the appended claims, the term "a number of" or similar language is meant to be understood broadly as any positive number including 1 to infinity.

Turning now to the figures, FIG. 1 depicts a system (100) for high frequency Morse code transmission, according to an example of principles described herein. To achieve its desired functionality, the system (100) includes various components. Each component may include a combination of hardware and program instructions to perform a designated function. The components may be hardware. For example, the components may be implemented in the form of electronic circuitry (e.g., hardware). Each of the components may include a processor to execute the designated function of the component. Each of the components may include its own processor, but one processor may be used by all the components. For example, each of the components may include a processor and memory. In another example, one processor may execute the designated function of each of the components.

As described above, the system (100) provides for the generation and decoding of a data signal, even when not within range of a mobile network. For example, even if a user is in a region where there is no internet or where they are otherwise outside of a cellular network, a user can communicate with other users, for example, in order to obtain emergency aid.

The system (100) includes a code generator (102). Morse code refers to an encoding scheme where alphanumeric characters are encoded as a sequence of two different signal durations. For example, an "A" is encoded as "• -" and "B" is encoded as "- • • •". Accordingly, using Morse code, human-readable messages can be converted into coded messages, which when received can be decoded and read by a receiver of the message. Accordingly, the system (100) includes a code generator (102), which may be a physical hardware chip, which generates a Morse code message from an intended message. For example, a user may generate the text message. "My tire is flat." The code generator (102) may receive this intended message and convert it into the proper sequence of signal durations as defined by the Morse code scheme. On a receiving device, the code generator (102) decodes a received Morse code message. That is, the code generator (102) receives a sequence of "dashes" and "dots" and decodes it into a human-readable message.

The code generator (102) may encode/decode a variety of types of messages. For example, the message may be an emergency message such as "SOS" or other widely recognized distress message. In other examples, the intended message may be a text message. For example, a user using a keypad or touch screen may type out a message, which may be a distress message or other message. The code generator (102) may encode this message for transmission. In yet another example, the message may be a location message. That is, the intended message may include a sequence of numbers that indicate a longitude and latitude of a user such that they may be located by a recipient of the message. While particular reference is made to a few particular types of intended messages, any variety of intended message may be encoded into Morse code by the code generator (102).

The system (100) also includes a mechanism to transmit the Morse code message. Specifically, the system (100) includes a high-frequency transceiver (104) which transmits and receives the Morse code message in the high frequency electromagnetic range. In general, mobile networks may transmit signals in the ultra-high frequency range, that is between 300 megahertz (MHz) and 3 gigahertz (GHz). Signals within this range may have limited transmission distance, propagate mainly in line of sight, and can be blocked by hills and large buildings. Signals within the high frequency range by comparison can travel longer distances as they can be reflected off the ionosphere layer back to ground. The high frequency range may be defined as being between 3 and 30 MHz. Accordingly, the high frequency transceiver (104) transmits and receives the Morse code message within this range. More specifically, the high frequency transceiver (104) may transmit the message in different particular bands within the high frequency range. These bands include 3.5-4.0 MHz; 7.0-7.3 MHz, 10.1-10.15 MHz; 14-14.35 MHz, 18.068-19.168 MHz, 21.0-21.45 MHz, 24.89-24.99 MHz, and 28.0-29.7 MHz, which may correspond to the amateur broadcast band.

Accordingly, the system (100) of the present specification provides for the transmission of a simple signal, i.e., Morse code message, at high frequencies, thus ensuring that any message can travel for long distances, even outside of a mobile network. Doing so ensures that a recipient who may be outside of the cellular range of a sender can be reached. In other words, the present system (100) uses high frequency transmission and Morse code to transmit messages, such as SOS messages. The data travels using high frequency waves reflected off layers of ionized atoms in the ionosphere. In other words, the present system (100) does not rely on a local network of more than one device, nor does it use data of other devices, to reach the first available tower or network or Morse code listening devices which may be far outside a reach of a mobile network.

A few specific examples are now presented. In a first example, an individual is on vacation alone in some remote area. The individual may not know who, from their contacts, is in the same area. Without the present system (100), the individual and their contacts may have to text back and forth to make such a determination. In some examples, as when in a remote area, such a determination may not even be possible. In another example, a user may be involved in an accident in a remote location and the present system (100) allows them to send out an emergency message seeking aide, even when outside of a mobile network.

In yet another example, using the system (100), friends can immediately be alerted when a user lands at an airport or arrives at a particular location. In yet another example, an individual can monitor the location of family members/ friends who may be outside of a cellular network.

Figure 2:
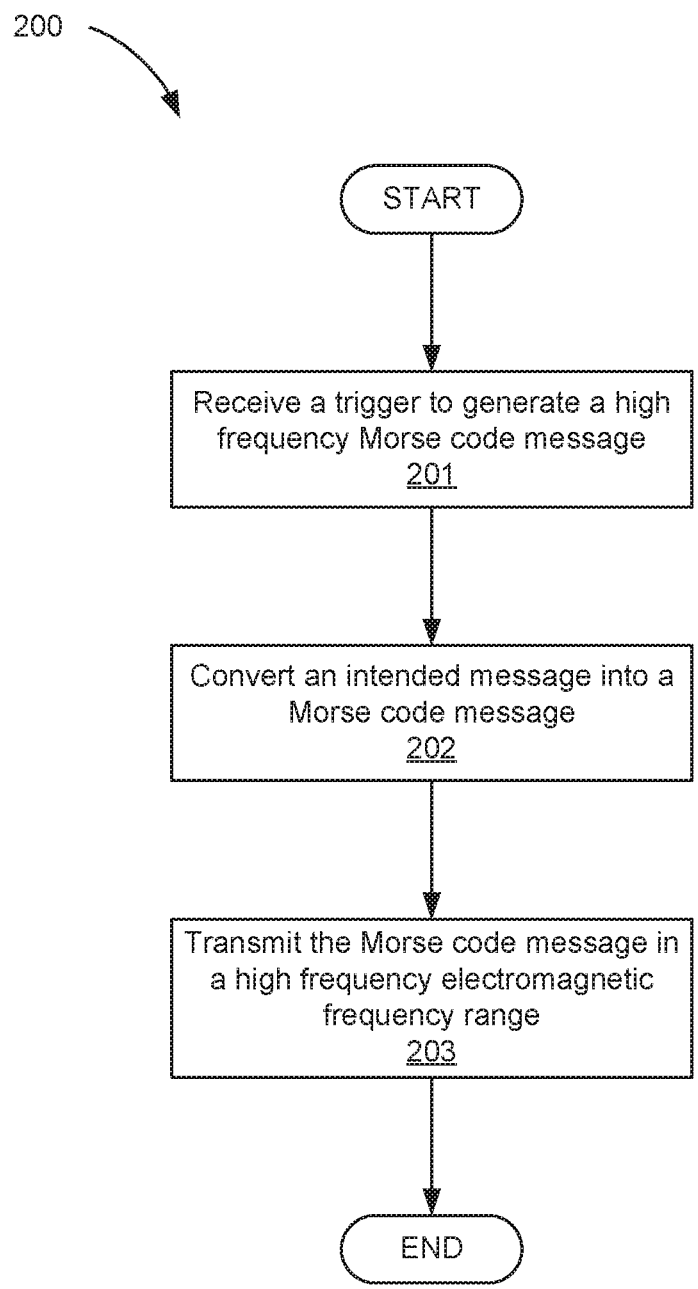
FIG. 2 depicts a method for high frequency Morse code transmission, according to an example of the principles described herein.

FIG. 2 depicts a method (200) for high frequency Morse code transmission, according to an example of the principles described herein. That is, as described above, the method (200) relies on a unique frequency signal generated from a mobile device that is transmitted to another person's mobile device. As described above, this unique frequency. i.e., the high frequency is available even when there are no mobile network towers nearby.

In some examples, both the sender and recipient may have options to choose transmission preferences. For example, a user may define a predetermined message that is sent out based on user indication or based on a particular schedule. In another example, a user can determine to disable/enable alerting certain contacts from the user's mobile device contact library or social media pages. For example, a user's contact library and/or social media data may be saved on a mobile device memory and therefore available offline.

According to the method (200), a trigger is received (block 201) to generate a high frequency Morse code message. For example, a mobile phone may have a user interface which allows a user to type in a message. The interface may have an icon that "sends" the message. The pushing of this "send" button may serve to trigger the generation of the Morse code version of the typed message.

In another example, a device, such as a mobile phone or a device tethered to the mobile phone, may include a mechanical button that when depressed triggers generation of a predetermined, or user-defined message, such as a distress signal.

In either case, the reception (block 201) of the trigger initiates conversion (block 202) of an intended message into a Morse code message. As described above, in some examples converting (block 202) the intended message into a Morse code message includes converting a text message into the Morse code message. In this example as will be detailed below, the text message may include an identity of a receiver of the message to which the Morse code message is to be transmitted. That is, the message may delineate a recipient who will receive the message.

In another example, converting (block 202) the intended message into a Morse code message includes, responsive to user input, generating a predetermined Morse code message. That is, as described above, either via a touch screen or a mechanical button of a mobile device/tethered device, a user may simply click on a button or icon, which triggers generation of a predetermined message. In some examples, the predetermined message may be set for a user. For example, a manufacturer may program the simple "SOS" as a predetermined message. In another example, a user may define the predetermined message. For example, via a user interface a user may program what message is to be sent when the button/icon is triggered.

In some cases, via this same user interface, a user can indicate to which recipients the message will be sent. For example, a user can specify who from their contacts is to be sent a message when the predetermined message button/icon is depressed. In some examples as will be described below, from this list of potential recipients, those who are within a predetermined distance of the user, i.e., which are closest to the user, may be the actual recipients of the message.

Following conversion (block 202) of the message, the Morse code message is transmitted (block 203) in the high frequency electromagnetic frequency range. As described above, by transmitting in this range, the signal transmits farther and does not rely on relay towers to propagate the signal long distances. Accordingly, users in remote areas, or otherwise far away from each other can still communicate with each other. Which may be particularly helpful in certain situations such as one of the users being in a remote area by themselves where they may potentially need medical, mechanical, or other emergency aide.

Figure 3:
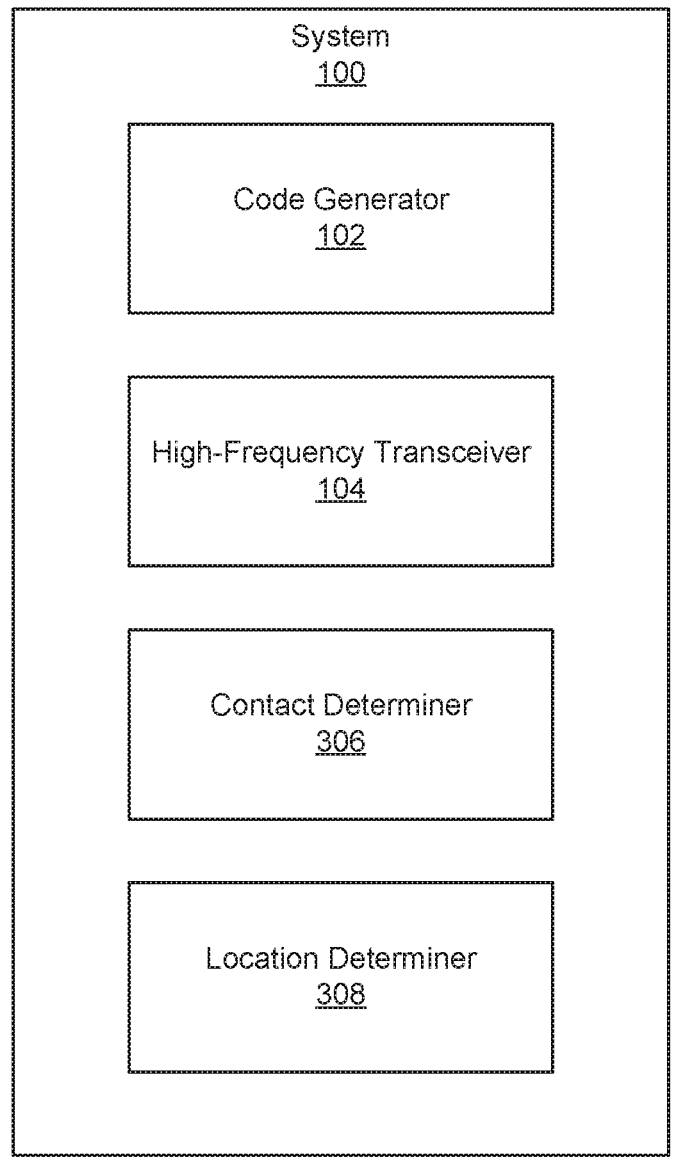
FIG. 3 depicts a system for high frequency Morse code transmission, according to another example of principles described herein.

FIG. 3 depicts a system (100) for high frequency Morse code transmission, according to another example of principles described herein. The system (100) in FIG. 3 includes components previously described such as the code generator (102) and the high-frequency transceiver (104). In some examples, the system (100) may include additional components. For example, the system (100) may include a contact determiner (306) to determine contacts of a user associated with a device in which the system is disposed. For example, a user of a mobile device may have a number of individuals for whom they have contact information. This contact information may be a telephone number, email address, or social media profile information stored in a contact library. In other examples, this user may be connected with people via a social media network, but may not have that information stored on a memory device of the mobile device. The contact determiner (306) identifies the contacts associated with the user by either analyzing the contacts library or accessing the social media contacts. In other words, the present system (100) allows for the automatic detection of connections of a mobile user based on mobile phone contacts and connections via social media. In some examples, such information is determined independently of connection with a mobile network. That is, even while outside of the mobile communication range, the contact device (306) can determine the contacts of a mobile user. As described above, in some examples a subset of these contacts may be identified as those who are candidates to receive a Morse code message.

The system (100) also includes a location determiner (308) to determine which of the above-described contacts of the user are within a predetermined distance of the user. Specifically, the location determiner (308) may determine which contacts of the individual are closest and may send the Morse code to that closest contact, or a predetermined number of those closest contacts. For example, a user may be located in a remote mountain range, out of coverage of a mobile network. In this example, the location determiner (308) may determine a GPS location of the user and may then not only determine contacts of the user, but may also, via location components in mobile devices, determine which contacts of that user are closest, for example in the next closest city and may send the message to that person. In other words, the location determiner (308) can ascertain the location of the user via GPS information from a GPS device of a mobile phone or tethered device and can ascertain similar information for the contacts of the user, or a user-identified subset of the contacts. Again, all this may be done even when a user is outside of the mobile network range. In the case of distress, this ensures that those contacts most able to help are contacted and can provide the needed aide.

In other words, the present system (100) detects when contacts of an individual are within a certain distance radius, even when a mobile signal is absent. This is done via data transmission via the high frequency range, which is generated by a mobile device or tethered device, to another user's mobile device using mobile/social media data which is available offline.

Figure 4:
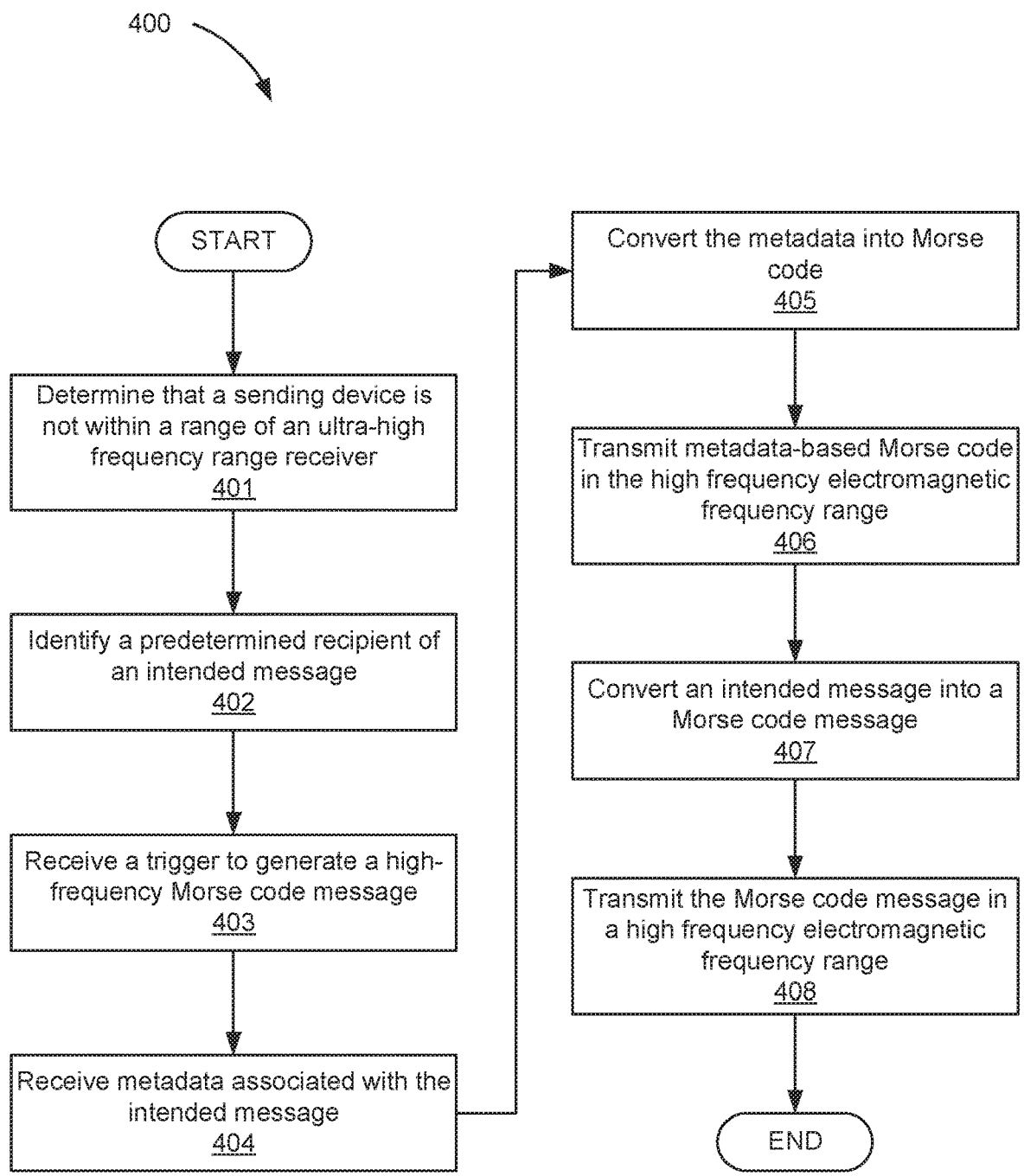
FIG. 4 depicts a method for high frequency Morse code transmission, according to another example of the principles described herein.

FIG. 4 depicts a method (400) for high frequency Morse code transmission, according to another example of the principles described herein. As described above, the present specification describes a compact device that does not consume large amounts of energy and that allows for communication with specific users notwithstanding the users being outside of a mobile network coverage area. This is done using high frequency data transmission of Morse code message between devices. In general, the method (400) automatically detects contacts around a user and prompts an alert to those users. As described above, this may be used in a variety of circumstances. For example, a user may be in distress in a remote location and the current system (FIG. 1, 100) and methods (FIG. 2, 200, 400) connect the distressed user immediately to contacts that are nearby, who will receive an alert. In some examples, the message recipient can send a reply message or a notification may simply be a blinking light indicating trouble. As described above, this method (400) operates even in the absence of mobile towers as it relies on high frequency, which can travel long distances.

According to the method (400), it is determined (block 401) whether a sending device is not within range of an ultra-high, or mobile frequency, range receiver. Being outside of this region makes it more difficult to transmit and receive data transmissions. Accordingly, when outside the ultra-high frequency range, the system (100) of the present disclosure is triggered to generate Morse code-based HF data transmissions.

According to the method (400) predetermined recipients are identified (block 402) for an intended message. That is, before going out of cell service, the user may identify certain individuals in a contact library or within a social media network that are to receive a distress message, if within a particular range of the user. Accordingly, when a distress event occurs, it is these individuals who are reached out to make contact with the distressed individual.

The system (FIG. 1, 100) may receive (block 403) a trigger to generate a high frequency Morse code message. This may be done as described in connection with FIG. 2. In addition to receiving the message itself, the system (FIG. 1, 100) receives (block 404) metadata associated with the intended message. Such metadata may include signals used in negotiating and/or pairing between electronic devices such that electronic devices can communicate one with another. The metadata may also include header information that can be used to identify a user of a mobile device that is intended to be a recipient of the user. As with the intended message itself, the metadata is also converted (block 406) into Morse code so that it can similarly be transmitted in networks outside the mobile network to facilitate negotiations/pairing for communications.

Once converted the metadata-based Morse code is transmitted (block 406) in the high frequency electromagnetic range to facilitate the pairing with select devices. After this pairing, the actual intended message is converted (block 407) into Morse code and transmitted (block 408) at the high frequency electromagnetic frequency range. These operations may be performed as described above in connection with FIG. 2.

Figure 5:
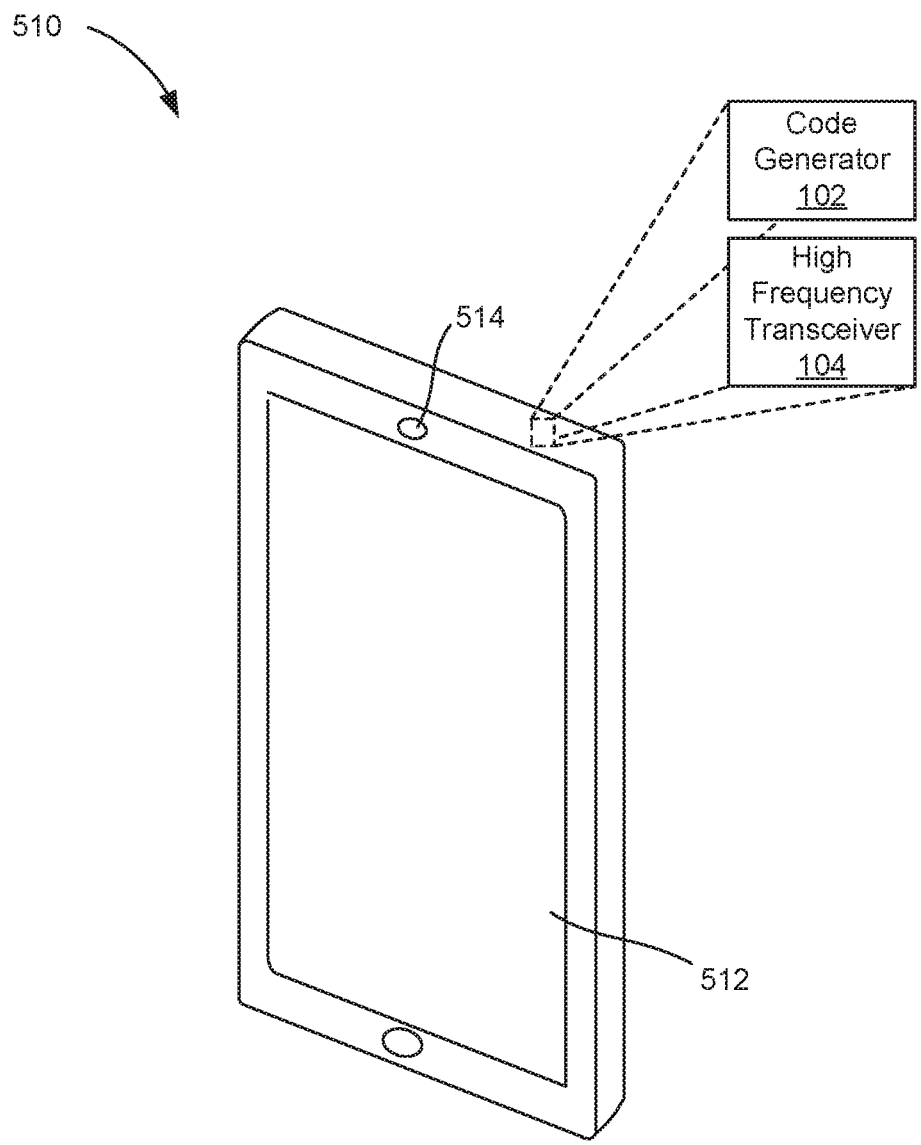
FIG. 5 depicts a mobile phone for high frequency Morse code transmission, according to an example of the principles described herein.

FIG. 5 depicts a mobile phone (510) for high frequency Morse code transmission, according to an example of the principles described herein. That is, the system (FIG. 1, 100) as described above may be implemented in a mobile phone (510) such as used by individuals to make phone calls and/or send text messages to other individuals. More specifically, the code generator (102) and the high-frequency transceiver (104) are disposed in a mobile phone (510).

In some examples, the system (FIG. 1, 100) includes a user input device to generate the intended message. For example, the user input device may be a touchscreen (512) that displays a keypad to generate the intended message. While FIG. 5 depicts a touchscreen (512) that displays the keypad, in other examples, the keypad may be separate from the display screen, such as a mechanical keypad disposed at another location on the mobile phone (510).

In some examples, the system (FIG. 1, 100) may include a different component to transmit the Morse code signal in a different format. For example, the system (100) may include a speaker (514) that transmits the Morse code message as an audible sequence of sounds. In this example, the code generator (102) generates the Morse code message and in addition to passing the Morse code message to the high frequency transceiver (104) the Message is transmitted to a speaker (514) and associated processing circuitry such that the Morse code message is audibly output through the speaker (514) so as to notify any individual within earshot of the presence of the mobile phone (510) and user. As described above, this may be helpful in distress situations as a nearby individual may hear the audible Morse code message and may come to the aide of the user.

Figure 6:
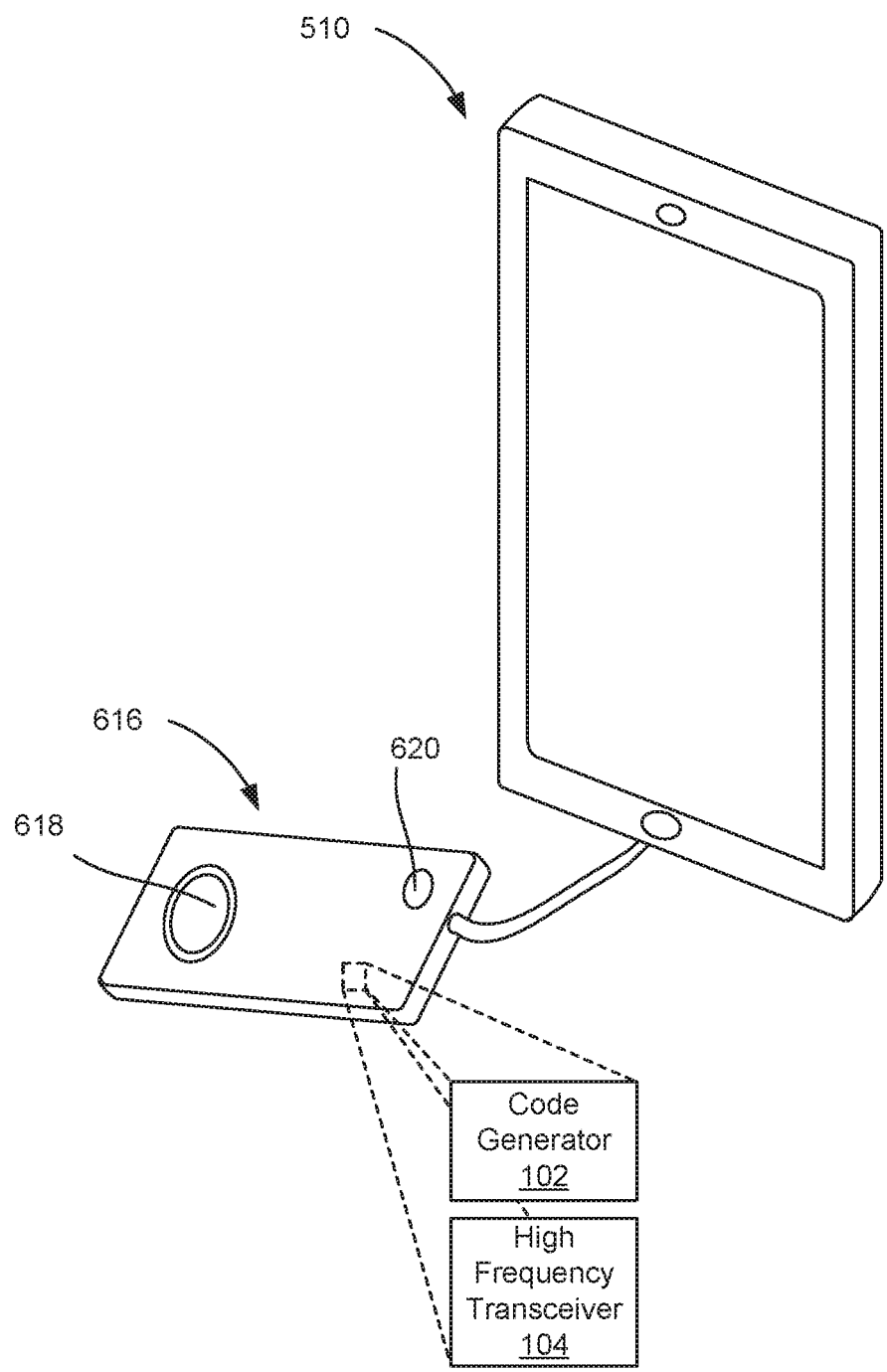
FIG. 6 depicts a device tethered to a mobile phone, which device is for high frequency Morse code transmission, according to an example of the principles described herein.

FIG. 6 depicts a device (616) tethered to a mobile phone (510), which device (616) is for high frequency Morse code transmission, according to an example of the principles described herein. That is, in the example depicted in FIG. 6, rather than the code generator (102) and the high frequency transceiver (104) being disposed on the mobile phone (510), these components may be disposed on an electronic device (616) that is tethered to a mobile phone (510). In this example, the tethered electronic device (616) may plug into the mobile phone (510), for example via a headphone jack. In some examples, the tethered electronic device (616) is self-powered and contains a battery for example. In other cases, the tethered electronic device (616) draws power from the battery of the mobile phone (510).

In this example, as with the example described above, the system (FIG. 1, 100) may further include a user input device to generate the intended message. In the example depicted in FIG. 6, the user input device is a button (620) that generates the intended message. The message generated upon depression of the button (620) may a predetermined message such as "SOS" or other distress signal. As described above, in some examples, the predetermined message may be user-defined beforehand, for example via a user interface.

Also as described above, the system (FIG. 1, 100) may include a different component to transmit the Morse code signal in a different format. For example, the system (100) may include a light source (618) that transmits the Morse code message as visible bursts of light. In this example, the code generator (102) generates the Morse code message and in addition to passing the Morse code message to the high frequency transceiver (104) the message is transmitted to a light source (618) and associated processing circuitry such that the Morse code message is visually output through the speaker (514) so as to notify any individual within earshot of the presence of the mobile phone (510) and user. As described above, this may be helpful in distress situations as a nearby individual may see the Morse code pulsations and may come to the aide of the user. While FIGS. 5 and 6 depict particular combinations of tethered vs. standalone devices and different secondary transmitters. Any combination of the above described components may be implemented in accordance with the principles described herein.

Figure 7:
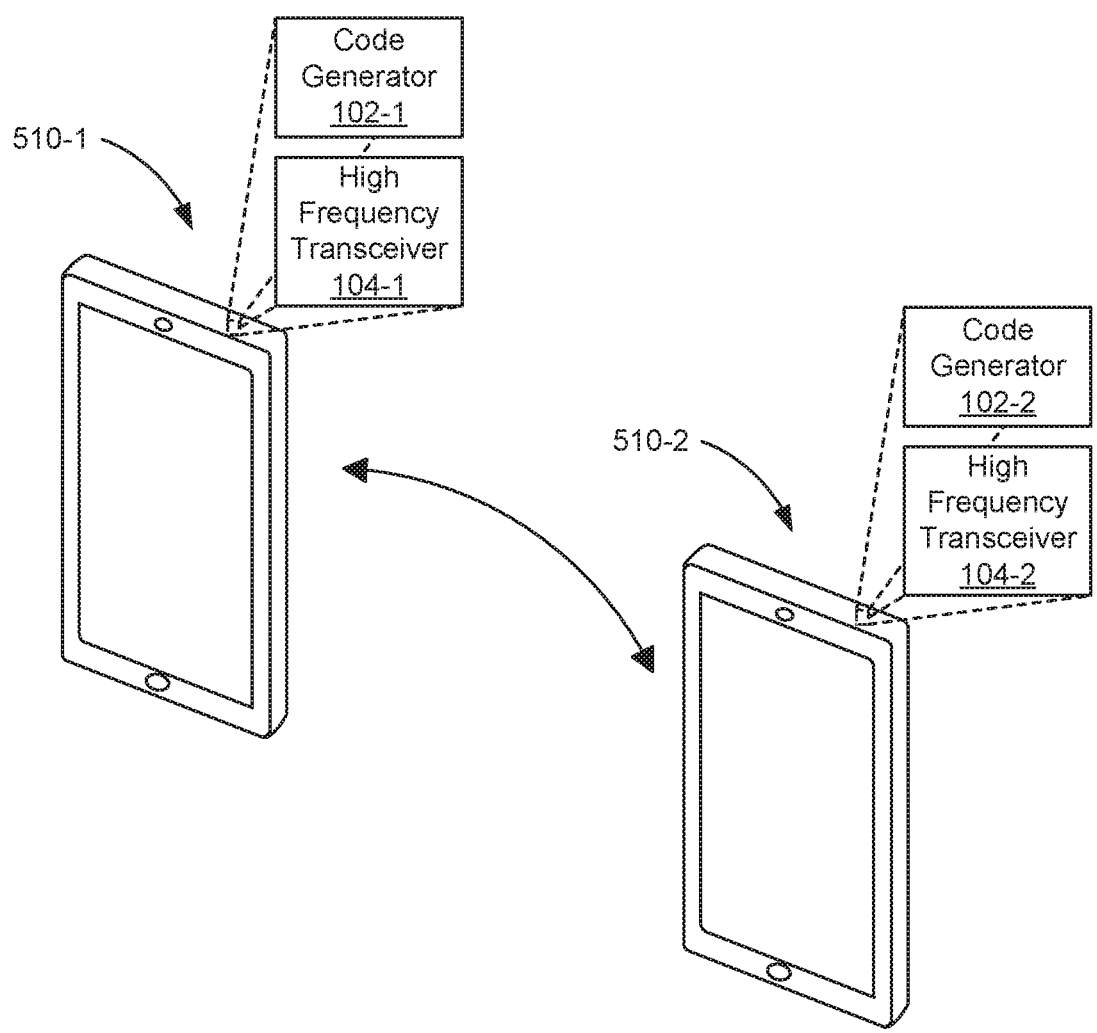
FIG. 7 depicts a device-to-device high frequency Morse code transmission, according to an example of the principles described herein.

FIG. 7 depicts a device-to-device high frequency Morse code transmission, according to an example of the principles described herein. Note that while FIG. 7 depicts two mobile phones (510) in direct communication, other device combinations may be implemented as well. For example, one of the mobile phones (510-1, 510-2) may be replaced with a tethered device (FIG. 6, 610). In other words. FIG. 7 is meant to depict a situation where each of the devices include code generators (102) and high-frequency transceivers (104). That is, in this example, each of the devices includes the components to negotiate and discover contacts and to transmit/receive messages to and from those contacts.

As a specific example, a first code generator (102-1) on the first mobile phone (510-1) generates a Morse code message from a text message and a first high frequency transceiver (104-1) on the first mobile phone (510-1) transmits this message over a band within the high frequency range. A second high frequency transceiver (104-2) which is on the second mobile phone (510-2) receives this signal and passes it to a second code generator (102-2) which is also on the second mobile phone (510-2). This second code generator (102-2) decodes the message such that it is readable to a user of the second mobile phone (510-2) who can take appropriate action to address a situation, such as an emergency situation. As described above, via the Morse code generators (102) and the high frequency transceivers (104)

pairing of the mobile phones (510) may take place to setup the environment where messages can be transmitted to and from certain mobile devices.

Figure 8:
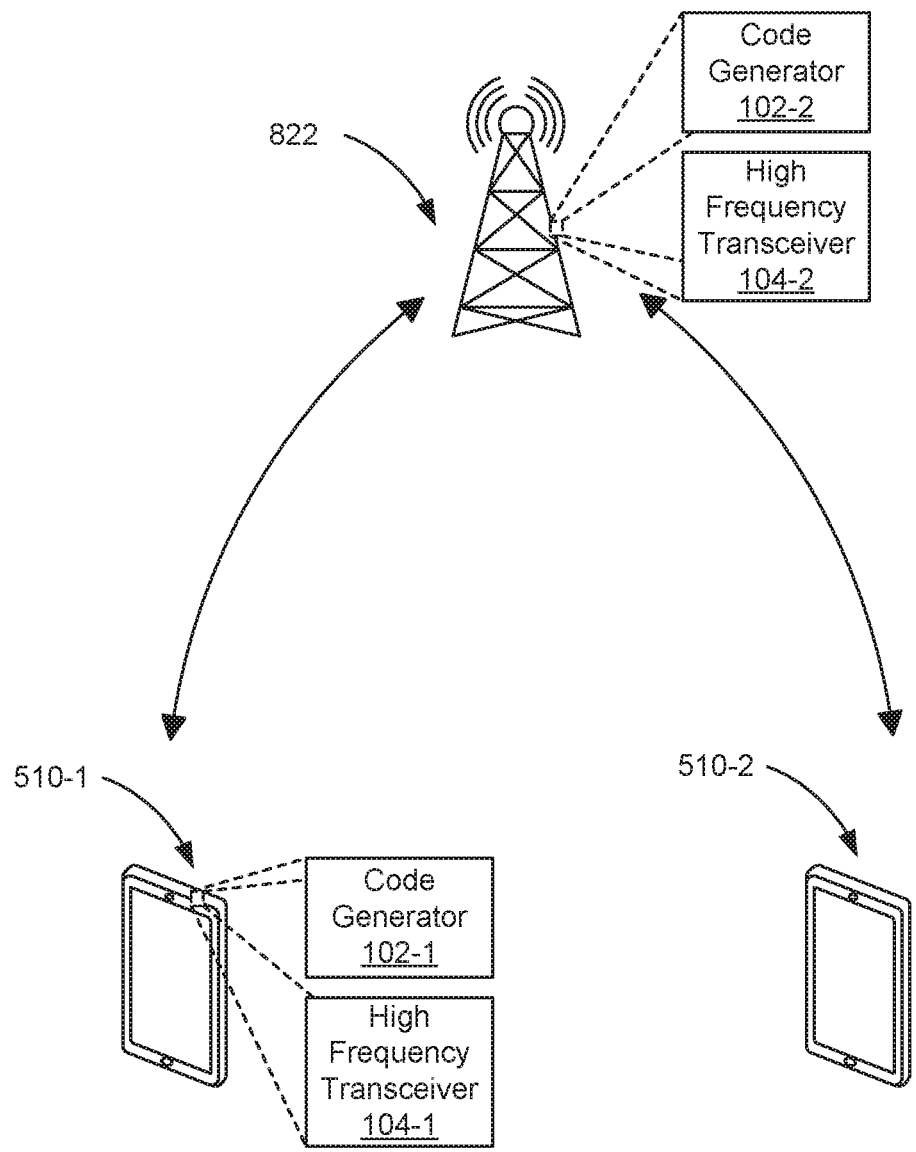
FIG. 8 depicts a device-to-tower high frequency Morse code transmission, according to an example of the principles described herein.

FIG. 8 depicts a device-to-tower high frequency Morse code transmission, according to an example of the principles described herein. Again, while FIG. 8 depicts two mobile phones (510), other device combinations may be implemented as well. For example, one of the mobile phones (510-1, 510-2) may be replaced with a tethered device (FIG. 6, 616).

FIG. 8 depicts a situation where just one of the mobile phones (510-1) includes the code generator (102) and high-frequency transceiver (104). In this example, the second system (FIG. 1, 100) is on a tower (822). That is, the code generator (102-2) and the high-frequency transceiver (104-2) are disposed on an antenna tower (822). Via this tower (822), high frequency Morse code communication is had with the first mobile phone (510-1). This tower (822) may have components to facilitate communication via other frequency ranges. For example, the antenna tower (822) may be a mobile telephone tower that can transmit signals in the ultra-high frequency to any mobile device (510-2) within range. Accordingly, the code generator (102-2) receives a Morse code message and decodes it such that it can be transmitted via an ultrahigh frequency transmitter on the antenna tower (822). In some examples, the tower (822) may be installed with the intent of communicating via the HF range. In other examples, the system (FIG. 1, 100) is installed on am existing control mobile towers to interpret and discover.

As a specific example, a first code generator (102-1) on the first mobile phone (510-1) generates a Morse code message from a text message and a first high frequency transceiver (104-1) on the first mobile phone (510-1) transmits this message over a band within the high frequency range. Similarly, a second high frequency transceiver (104-2) which is on the antenna tower (822) receives this signal and passes it to a second code generator (102-2) which is also on the antenna tower (822). This second code generator (102-2) decodes the message such that it is readable to a user of the second mobile phone (510-2) and transmits the decoded message to the second mobile phone (510-2) who can take appropriate action to address a situation, such as an emergency situation.

Figure 9:
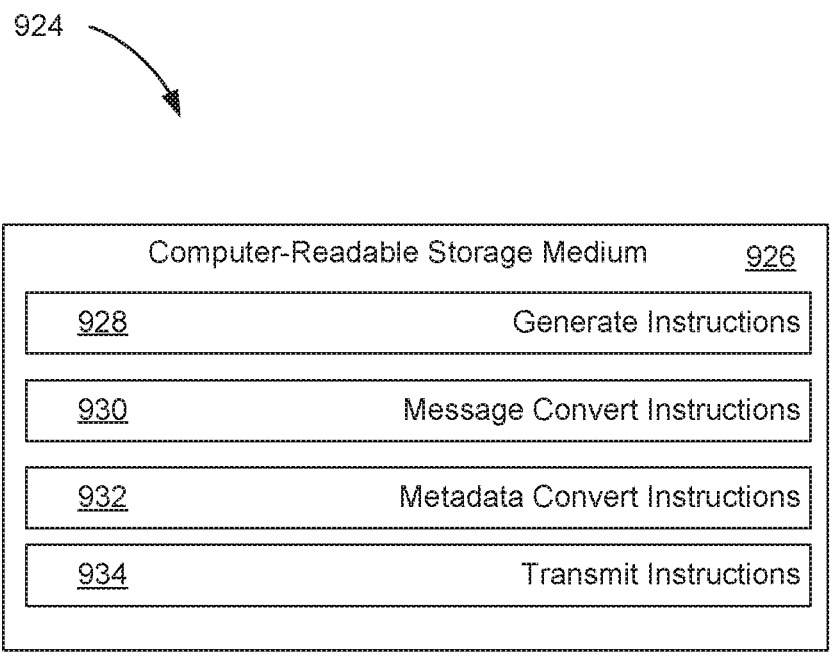
FIG. 9 depicts a computer program product with a computer readable storage medium for high frequency Morse code transmission, according to an example of principles described herein.

FIG. 9 depicts a computer program product (924) with a computer readable storage medium (926) for high frequency Morse code transmission, according to an example of principles described herein. To achieve its desired functionality, a computing system includes various hardware components. Specifically, a computing system includes a processor and a computer-readable storage medium (926). The computer-readable storage medium (926) is communicatively coupled to the processor. The computer-readable storage medium (926720) includes a number of instructions (928, 930, 932, 934) for performing a designated function. The computer-readable storage medium (926) causes the processor to execute the designated function of the instructions (928, 930, 932, 934).

Referring to FIG. 9, generate instructions (928), when executed by the processor, cause the processor to generate an intended message. Message convert instructions (930), when executed by the processor, may cause the processor to convert the intended message into a Morse code message. Metadata convert instructions (932), when executed by the processor, may cause the processor to convert metadata associated with the intended message into Morse code. In this example, the metadata includes identification information for an intended recipient. Transmit instructions (934), when executed by the processor, may cause the processor to transmit the Morse code message and metadata-based Morse code in a high frequency electromagnetic frequency range.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. In one example, the computer usable program code may be embodied within a computer readable storage medium; the computer readable storage medium being part of the computer program product. In one example, the computer readable storage medium is a non-transitory computer readable medium.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system, comprising:
a code generator to:
  generate a Morse code message from an intended message; and
  decode a received Morse code message;
a contact determiner to automatically determine, from a user's contact library of a user device in which the system is disposed, intended recipients of the intended message;
a location determiner to determine:
  coordinates of the transmitter; and
  which of the intended recipients from the user's contact library are within a predetermined distance of the user; and
a high-frequency transceiver to:
  transmit Morse code messages in a high frequency electromagnetic range to intended recipients that are within the predetermined distance of the user, wherein:
    transmitting a Morse code message comprises multiple transmissions, with a first set establishing a pairing between the user device and a device of an intended recipient that is within the predetermined distance of the user; and
    a Morse code message comprises coordinates of the transmitter; and
  receive Morse code messages in the high frequency electromagnetic range.

2. The system of claim 1, wherein the intended message is at least one of an emergency message, a text message, a location message, and a voice message.

3. The system of claim 1, wherein the code generator and high-frequency transceiver are disposed on a mobile phone.

4. The system of claim 1, wherein the code generator and high-frequency transceiver are disposed on an electronic device tethered to a mobile phone.

5. The system of claim 1, wherein the code generator and high-frequency transceiver are disposed on an antenna tower.

6. The system of claim 1:
further comprising a user input device to facilitate a user typing out the text of an intended message, and
wherein the user input device comprises a keypad on which the user types out the intended message.

7. The system of claim 1, further comprising a secondary transmitter to transmit the Morse code signal in a different format.

8. The system of claim 7, wherein the different format is at least one of an audible format and a visual format.

9. A computer-implemented method, comprising:
receiving, from a mobile device, a trigger to generate a high frequency Morse code message;
automatically determining, from a user's contact library of a user device in which the system is disposed, intended recipients of the intended message;
determining which of the intended recipients from the user's contact library are within a predetermined distance of the user;
converting an intended message into a Morse code message;
transmitting the Morse code message in a high frequency electromagnetic frequency range to intended recipients that are within the predetermined distance of the user, wherein the Morse code message comprises coordinates of a transmitter;
receiving, from the mobile device, metadata associated with the intended message, wherein the metadata comprises a unique identifier and header information identifying the intended recipients that are within the predetermined distance of the user;
converting the metadata into Morse code; and
transmitting metadata-based Morse code in the high frequency electromagnetic frequency range, wherein transmitting the metadata-based Morse code comprises transmitting multiple transmissions, with a first set establishing a pairing between the user device and a device of an intended recipient that is within the predetermined distance of the user.

10. The computer-implemented method of claim 9, wherein converting an intended message into a Morse code message comprises converting a text message into the Morse code message.

11. The computer-implemented method of claim 10, wherein the text message comprises an identity of a receiver of the message to which the Morse code message is to be transmitted.

12. The computer-implemented method of claim 9, wherein converting an intended message into a Morse code message comprises, responsive to user input, generating a predetermined Morse code message.

13. The computer-implemented method of claim 9, wherein the metadata-based Morse code is used to pair a sending the user device with a receiving the device of the intended recipient using unique device identifiers.

14. The computer-implemented method of claim 9, further comprising determining that a sending device is not within range of an ultra-high frequency receiver.

15. The computer-implemented method of claim 9, further comprising identifying a predetermined recipient of the intended message before going outside of the range of the ultra-high frequency receiver.

16. A computer program product, the computer program product comprising a computer readable storage medium having program instructions embodied therewith, the program instructions executable by a processor, to cause the processor to:
generate, by the processor, an intended message;
automatically determine, from a user's contact library of a user device, intended recipients of the intended message;
determine which of the intended recipients from the user's contact library are within a predetermined distance of the user;
convert, by the processor, the intended message into a Morse code message;
convert, by the processor, metadata associated with the intended message into Morse code, wherein the metadata includes identification information for the intended recipient within the predetermined distance of the user; and
transmit the Morse code message and metadata-based Morse code in a high frequency electromagnetic frequency range to intended recipients that are within the predetermined distance of the user, wherein transmitting the Morse code message comprises transmitting multiple messages, a first set establishing a pairing between the user device and a device of an intended recipient that is within the predetermined distance of the user.

17. The computer program product of claim 16, wherein the Morse code message and metadata-based Morse code are transmitted in at least one of the following frequency bands:
3.5 to 4.0 megahertz (MHz);
5.0 to 7.3 MHz;
8.1 to 10.15 MHz;
14 to 14.35 MHz;
15.068 to 19.168 MHz;
21.0 to 21.45 MHz;
24.89 to 24.99 MHz; and
28.0 to 29.7 MHz.

* * * * *